United States Patent [19]

Endfield et al.

[11] 4,443,789
[45] Apr. 17, 1984

[54] KEYBOARD

[75] Inventors: Cyril Endfield, London; Christopher J. Rainey, Croydon, both of England

[73] Assignee: Microwriter Limited, London, England

[21] Appl. No.: 320,925

[22] Filed: Nov. 13, 1981

Related U.S. Application Data

[63] Continuation of Ser. No. 973,628, Dec. 27, 1978, abandoned, which is a continuation of Ser. No. 743,291, Nov. 18, 1976, abandoned, which is a continuation of Ser. No. 542,055, Jan. 17, 1975, abandoned.

[30] Foreign Application Priority Data

Jan. 22, 1974 [GB] United Kingdom ............... 2915/74

[51] Int. Cl.³ ............................................. G06F 3/02
[52] U.S. Cl. ............................ 340/365 R; 340/365 S;
400/479; 400/486
[58] Field of Search .................. 340/365 R, 365 S; 178/17 C, 21; 179/90 K; 400/485, 486, 90, 89, 477, 479, 472, 489

[56] References Cited

U.S. PATENT DOCUMENTS

| | | | |
|---|---|---|---|
| 2,581,665 | 1/1952 | Jarmann | 340/365 R |
| 2,682,046 | 6/1954 | Hack | 340/365 R |
| 3,022,878 | 2/1962 | Seibel et al. | 340/365 R |
| 3,428,747 | 2/1969 | Alferieff | 340/365 R |
| 3,675,513 | 7/1972 | Flanagan et al. | 179/2 DP |
| 3,833,765 | 9/1974 | Hilborn et al. | 340/365 R |
| 3,892,915 | 7/1975 | Budworth et al. | 340/365 S |

FOREIGN PATENT DOCUMENTS

| | | |
|---|---|---|
| 1343913 | 11/1962 | France . |
| 475292 | 11/1937 | United Kingdom . |
| 875275 | 8/1961 | United Kingdom . |
| 1015466 | 12/1965 | United Kingdom . |
| 1105116 | 3/1968 | United Kingdom . |
| 1292113 | 10/1969 | United Kingdom . |
| 1170570 | 11/1969 | United Kingdom . |
| 1290966 | 9/1972 | United Kingdom . |
| 1318490 | 5/1973 | United Kingdom . |
| 1456229 | 11/1976 | United Kingdom . |

OTHER PUBLICATIONS

*European Scientific Notes*, Apr. 30, 1978, ESN32-4, pp. 149-151.
"Alpha-Dot: A New Approach to Direct Computer Entry of Battlefield Data", U.S. Army, Jan. 1974.

*Primary Examiner*—James J. Groody
*Attorney, Agent, or Firm*—LeBlanc, Nolan, Shur & Nies

[57] ABSTRACT

Disclosed herein is an electrical keyboard having five keys arranged conveniently for the fingers of an operators hand, a memory to store the signals from each key, logic circuit to instruct said stored data after release of the last of said keys and an encoder to receive said stored signals and produce electrical output signals corresponding to readable characters; each character signal requiring a single operation of a unique combination of said input keys for production of said signal.

20 Claims, 4 Drawing Figures

4,443,789

KEYBOARD

This is a continuation of application Ser. No. 973,628, filed Dec. 27, 1978, which in turn is a continuation of Ser. No. 743,291 filed Nov. 18, 1976 which in turn is a continuation of Ser. No. 542,055 filed Jan. 17, 1975 all now abandoned.

This invention relates to keyboards and particularly, but not exclusively, relates to electrical keyboards for encoding electrical signals representing alphanumeric and other readable characters.

In its broadest aspect, the invention seeks to provide an electrical keyboard having a small number of parallel-acting input keys controlling a coding device, the keys being operated in various combinations to produce a set of signals representing a larger number of desired characters.

According to the invention, an electrical keyboard has input keys arranged conveniently for the fingers of an operators hand, the keys being connected to control an electronic encoding device to produce electrical output signals corresponding to readable characters, each character signal requiring a single operation of a unique combination of the input keys for production of the signal.

In one embodiment storage means are provided to hold each signal produced by operation of individual keys and logic means are provided to instruct the storage means to pass on the held signal data after the last key has been released.

In another embodiment of the invention, there are five input, character-controlling keys arranged on a plane surface, generally conforming to an arch shape.

A suitable code for use with the invention is a mnemonic code having a pictorial relationship between those keys to be operated and the character to be encoded.

One embodiment of a keyboard, a mnemonic code and other features of the invention are illustrated, by way of example, on the accompanying drawings, in which.

Figure 1:
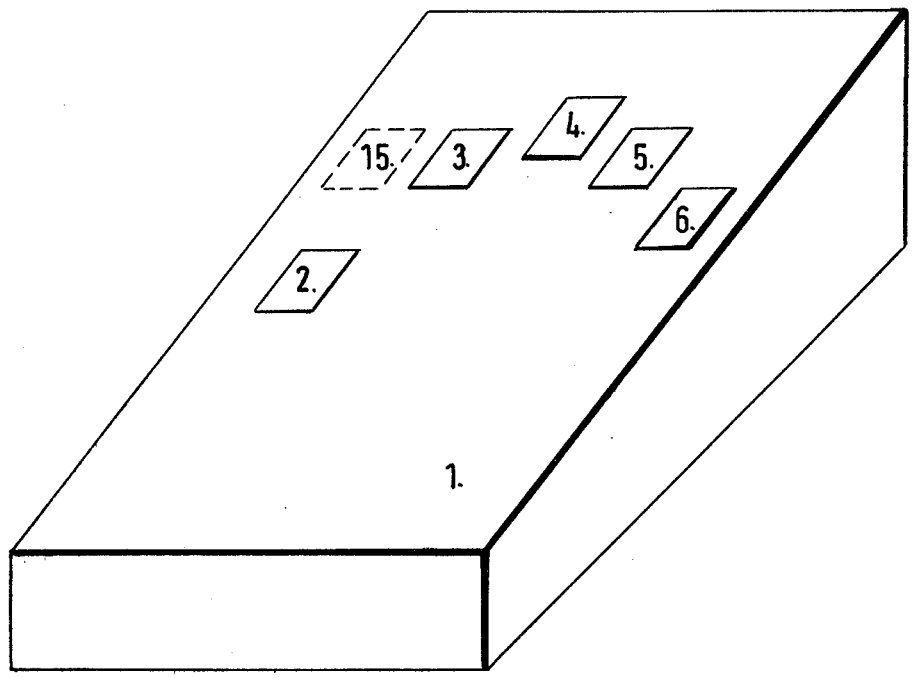
FIG. 1 is a view of a five-key keyboard in accordance with the invention.

As shown by FIG. 1, the keyboard is essentially a simple device consisting of an inclined plane surface 1 on which five switching keys 2,3,4,5 and 6 are arranged in a generally arch shape to be convenient to the fingers of an operators hand; in this case the right hand, switch 2 being the thumb key, switch 3 the index finger key, switch 4 the middle finger key, switch 5 the ring finger key and switch 6 the little finger key. As is evident from FIG. 1, the keys 2,3,4,5 and 6 will be convenient to the fingers of the hand when the hand is resting on the plane surface 1.

Other required functions of the keyboard 1, such as SHIFT, BACKSPACE, UPPER/LOWER CASE are performed by use of particular key combination codes or the provision of additional switch keys, as indicated in dotted form by key 15, is an alternative.

Figure 2:
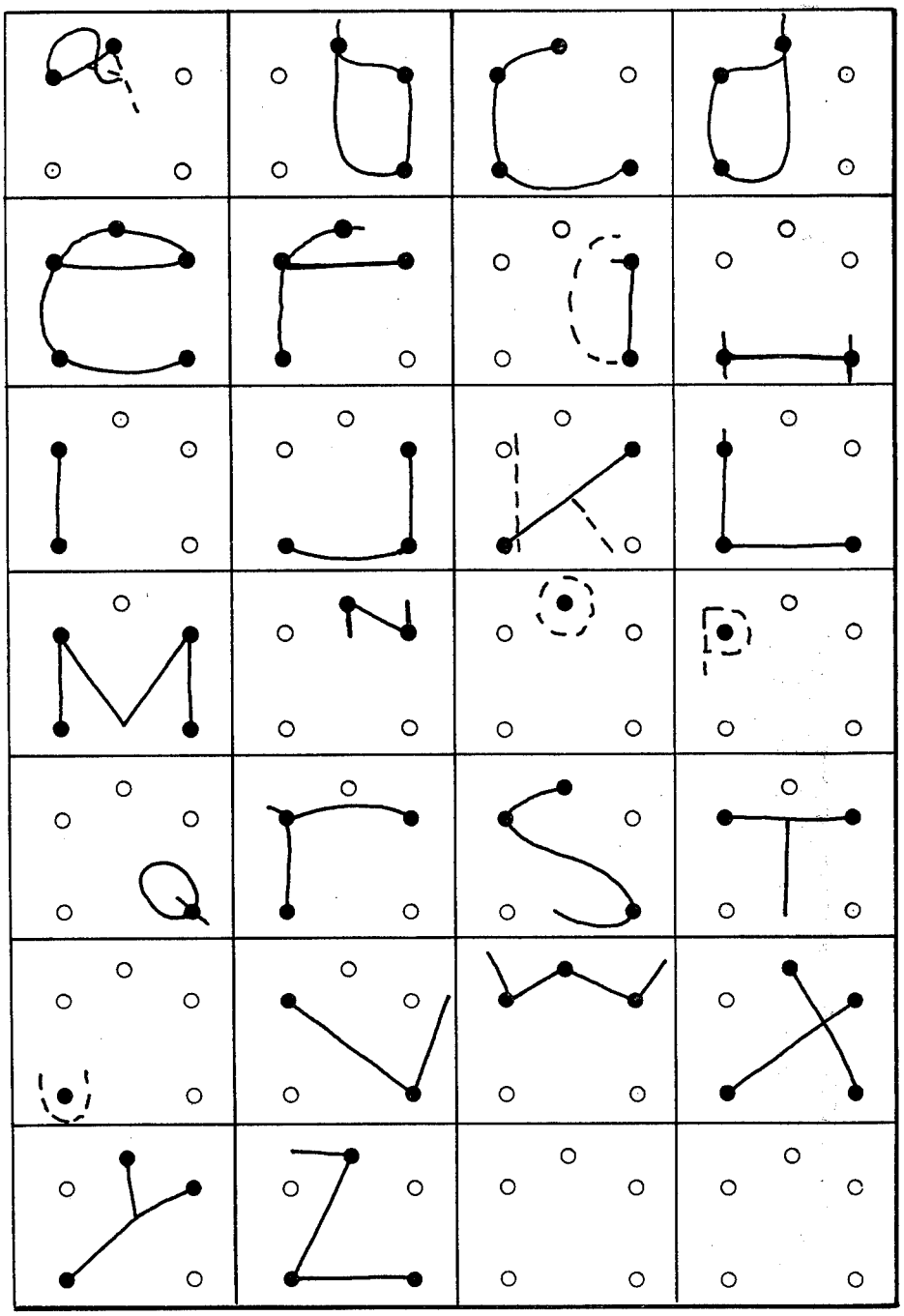
FIG. 2 is a pictorial representation of a suitable mnemonic code for use with a keyboard in accordance with the invention.

FIG. 2 shows a pictorial chart of a mnemonic alphabetic code for use with the keyboard of the invention. There being five character-controlling keys, it is possible to operate the keys in 31 different combinations. As can be seen, the keys are chosen so that, for most letters, the keys to be operated can be joined in the imagination by lines to form the respective letter, e.g. the letter C is encoded by pressing the thumb, index, middle and little finger keys.

Figure 3:
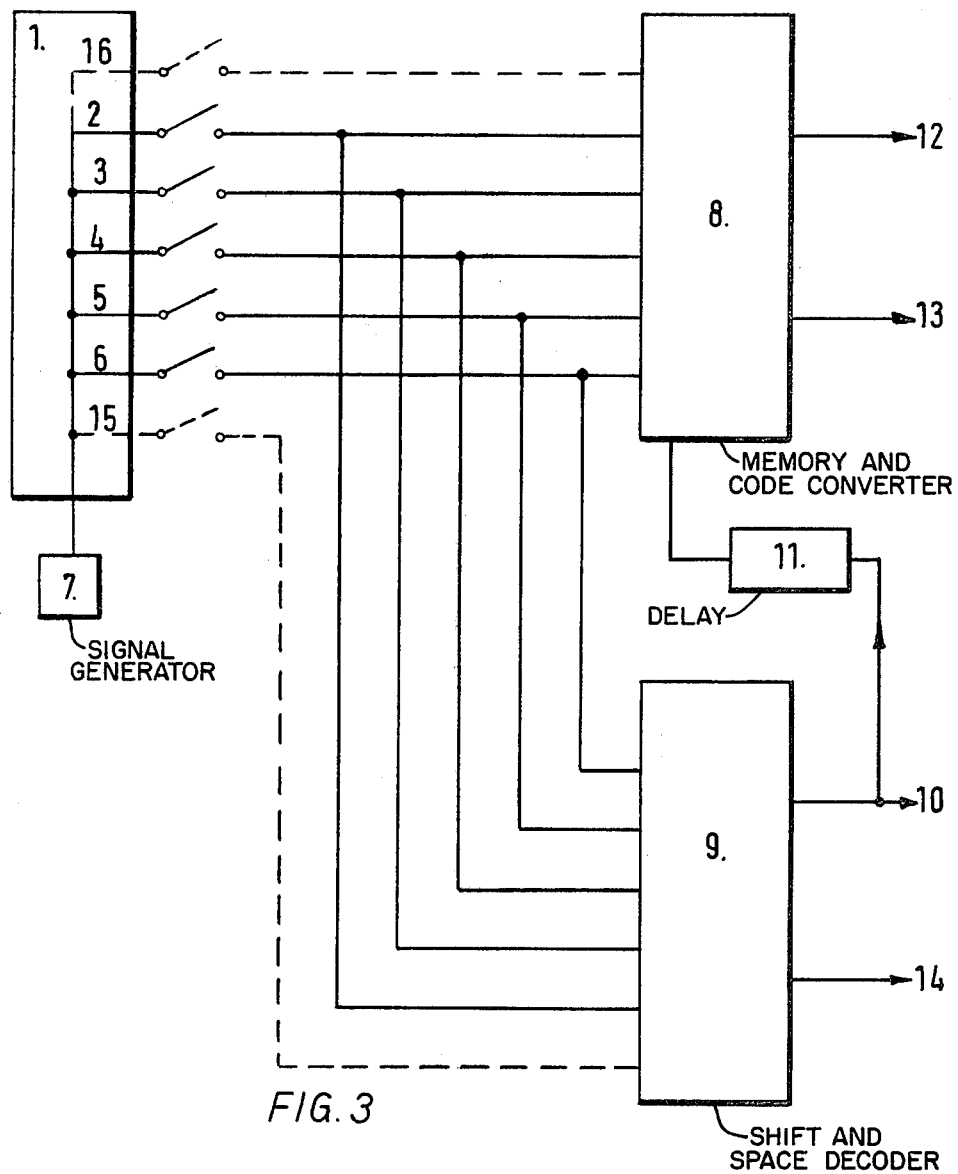
FIG. 3 is a schematic diagram of the major components of an electronics encoding device for the invention.

As shown by FIG. 3 the encoding device of one embodiment of the invention comprises the keyboard 1 having five key-switches 2,3,4,5,6, all being of a normally open type, e.g. spring-loaded to the "open" position or capacitive switches closed by contact by an operator's finger. The switches produce output signals and are fed from a suitable signal generator 7, e.g. a D.C. source.

The outputs of the keys 2 to 6 are connected in parallel to the inputs of a memory and code-converter 8 and a shift and space decoder 9.

The memory and code converter 8 stores the signal produced by each of keys 2 to 6, i.e. 0 or 1 depending on whether the key is pressed or not. The shift and space decoder 9 responds to release of the last of those keys that have been depressed to encode a particular character, by producing a strobe signal 10. This strobe signal is fed to the memory and code-converter 8 via a delay 11 and clears the memory, which action presents the stored information to the code-converter in that the output 12 and 13 of the memory and code-converter 8 is the particular character translated into any chosen code, e.g. binary.

The shift and space decoder 9 also produces a shift signal 14 in response to a particular code of signals from the keys 2 to 6 or to a signal from a special shift key 15 (shown in dotted form) in keyboard 1.

Errors can be cleared from the memory by either a particular code of signals from the keys 2 to 6 or by a clear error signal from a special key 16 (shown in dotted form) in keyboard 1.

We believe that encoding the complete signal for a particular character only when the final key of a particular code combination has been released, to be an important feature of this invention.

Figure 4:
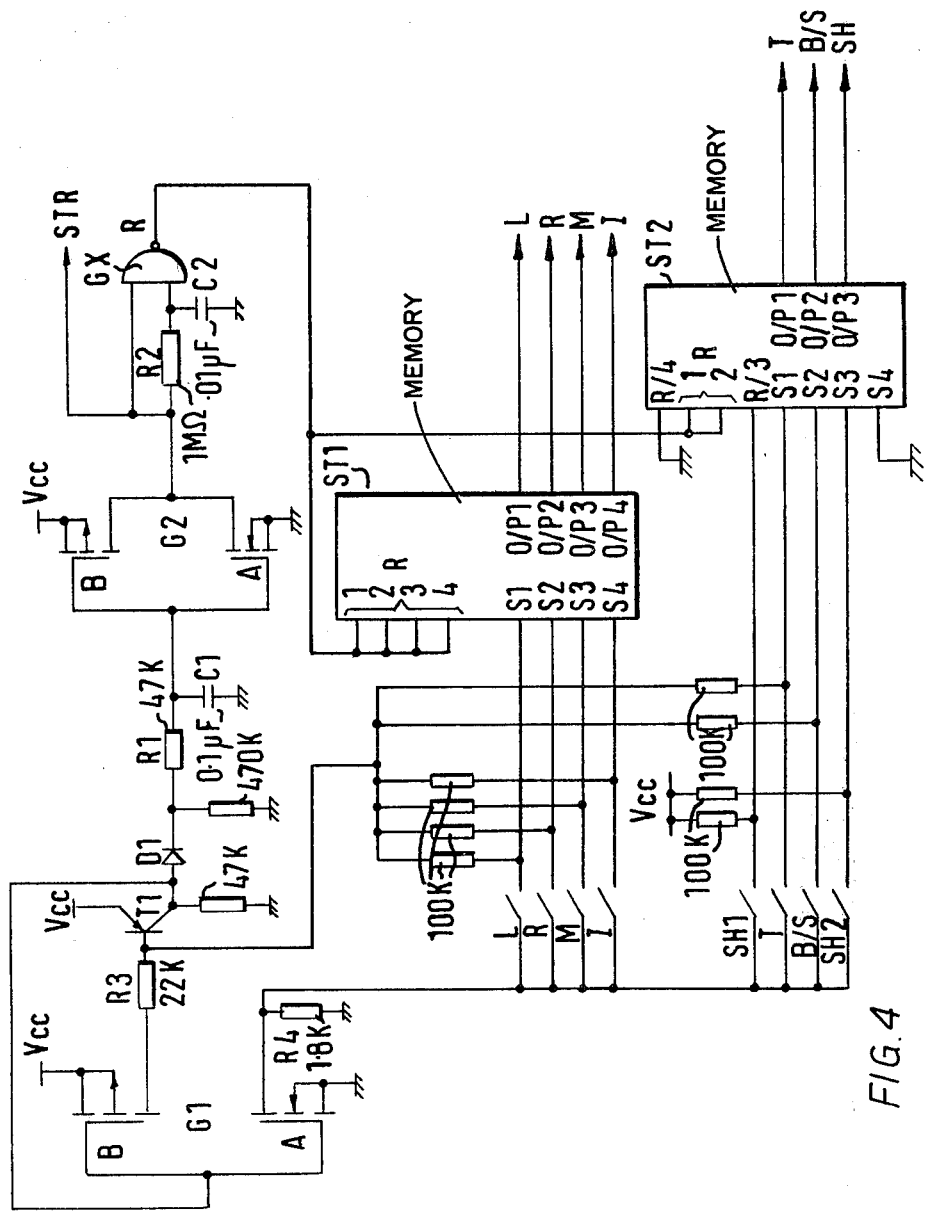
FIG. 4 is a circuit diagram of storage and logic means for use with the embodiment of the invention.

In the storage and logic means shown by the circuit of FIG. 4, there are eight keyboard switches:
L—little finger key
R—ring finger key
M—middle finger key
I—index finger key
$SH_1$—shift reset key
T—thumb key
B/S—backspace
$SH_2$—shift set key In the circuit, gates $G_1$ and $G_2$ are Cosmos dual complimentary pair plus inverter style 4007 gates, gate $G_X$ in a Cosmos nand gate, memories $ST_1$ and $ST_2$ are Cosmos nand R-S style 4044 latches and transistor $T_1$ is a general purpose, medium gain, low current PNP transistor.

In the idle mode of the circuit, gate $G_{1A}$ is off, gate $G_{1B}$ is on, transistor $T_1$ is off, gate $G_{2A}$ is off and gate $G_{2B}$ is on.

Memories $ST_1$ and $ST_2$ are reset via nand gate $G_X$ the output of which is low and, as a result of this, the memory outputs $O/P_1$, $O/P_2$, $O/P_3$, and $O/P_4$ of store $ST_1$ (representing signals from keys L, R, M and I) and $O/P_1$ and $O/P_2$ of memory $ST_2$ (representing signals from keys T and B/S) are all high as the stores are quad cross-coupled nand gates in R-S flip mode.

Operation of one or more of the keys L, R, M, I, T or B/S causes current to flow through resistor $R_3$ and gate $G_{1B}$ and through resistor $R_4$. With current commencing to flow through resistor $R_3$ the voltage across the resistor will rise until the base switch-on voltage of the transistor $T_1$ is reached so that current flows into the base and the transistor is switched on.

The effect of transistor $T_1$ turning on is to change the state of the circuit. Gate $G_{1B}$ switches off, providing more base drive current for the transistor, and gate $G_{1A}$ switches on, shunting out resistor $R_4$, again providing more base drive current for the transistor.

After a delay set by the values of resistor $R_1$ and capacitor $C_1$, gate $G_2$ changes state and its strobe output goes low and the reset signal R from gate $G_X$ is removed.

Data corresponding to operation of the keys is now stored in memories $ST_1$ and $ST_2$ and data is available at the memories outputs.

Only when all the keys have been released will be strobe output signal from gate $G_2$ go high and, after a delay set by the values of resistor $R_2$ and capacitor $C_2$, will enuse gate $G_X$ to change state and its output reset signal to the memories will be resumed.

The shift switches $SH_1$ and $SH_2$ respectively reset or set an R-S flip flop in store $ST_2$ to provide a data bit from output $O/P_3$ which is used to signify a lower or upper shift.

In an alternative mode of operation, the circuit can be arranged so that keyed data remains in store until the first key operation of the next entry. In either operational mode it is the output of gate $G_2$ going high that produces the strobe signal that causes the memories $ST_1$ and $ST_2$ to transfer or pass on the stored data.

The outputs of the two memories are connected to the encoding device (not shown), so that the keyed signals can be converted into any desired code.

The five key embodiment of the invention described provides a keyboard that can be operated by one hand with one finger per key without any need to move fingers between keys. The 31 different combinations that are available with five keys enable all the letters of the alphabet to be produced with sufficient spare combinations for such functions as a shift to numerals, space, backspace, correct entry.

The keyboard can be made portable and self-powered by internal "flash-light" type batteries so that, when combined with a visual alphabetic display responsive to the output signals, a combination is obtained that is eminently suitable for use by the handicapped, for example those who are partially paralysed and speechless. The pictorial mnemonic code shown by FIG. 2 enables a person to rapidly gain skill in use of such a combined keyboard and display as a communication device.

A keyboard in accordance with the invention has many other applications, especially where low cost and portability are required, possible examples of such use being in computer terminals, telephone adaptors for the blind, communication links for noisy environments. The individual bit signals supplied by the key-operated switches shown in FIGS. 3 and 4 are collectively referred to as a "coded electrical output", there consequently being a unique coded electrical output for each character in the alphabetic system. The phrase "coded electrical output" is also intended to cover a serialized bit output as well as the parallel bit output shown in FIG. 3.

We claim:

1. A keyboard operated signal producing apparatus comprising an input keyboard having a set of five manually operable finger keys arranged for operation with only one hand, and each of said keys being arranged for operation with a different finger of said one hand, said keys being selectively operable to provide a different pre-selected combination of operated and non-operated ones of said keys for each alphabetic character in an alphabetic system having a total number of characters greatly exceeding the number of said keys, means responsive to operation of selected ones of said keys for producing a unique coded electrical output for each of the different combinations of operated and non-operated ones of said keys, whereby each unique coded output represents a different character in said system, there being a unique pre-selected combination of said keys assigned for operation to represent each character in a majority of the characters making up said system to thereby provide a group of unique key combinations in which each unique key combination of the group represents a different character in said majority of characters, the arrangement of said keys being pre-selected to provide a pictographic relationship between each key combination in a majority of said unique combinations and the alphabetic character represented thereby.

2. The keyboard operated signal producing apparatus defined in claim 1 wherein the pre-selected key arrangement providing said pictographic relationship is such that the keys making up each unique key combination in said majority of unique key combinations lie along spaced apart points of a geodesic outline of the alphabetic character represented by the unique key combination.

3. The keyboard operated signal producing apparatus defined in claim 1 wherein the letter f is represented by one of the key combinations in said majority of unique key combinations and wherein the keys assigned to represent the letter f are the ones positioned to be operated by the operator's thumb, index finger, middle finger and ring finger.

4. The keyboard operated signal producing apparatus defined in claim 1, wherein the letter j is represented by one of the key combinations in said majority of unique key combinations, and wherein the keys assigned to represent the letter j are the ones positioned to be operated by the operator's thumb, little finger and ring finger.

5. The keyboard operated signal producing apparatus defined in claim 1, wherein the letter l is represented by one of the key combinations in said majority of unique key combinations, and wherein the keys assigned to represent the letter l are the ones positioned to be operated by the operator's index finger, thumb and little finger.

6. The keyboard operated signal producing apparatus defined in claim 1 wherein the letter c is represented by one of the key combinations in said majority of unique key combinations, and wherein the keys assigned to represent the letter c are the ones positioned to be operated by the operator's middle finger, index finger, thumb and little finger.

7. The keyboard operated signal producing apparatus defined in claim 1 wherein the letter r is represented by one of the key combinations in said majority of unique key combinations, and wherein the keys assigned to represent the letter r are the ones positioned to be operated by the operator's thumb, index finger and ring finger.

8. The keyboard operated signal producing apparatus defined in any one of the preceding claims 1–7 wherein said keys are arranged along an arcuate line.

9. The keyboard operated signal producing apparatus defined in any one of the preceding claims 1–7 wherein said keys are arranged along an arch-shaped line.

10. The keyboard operated signal producing apparatus defined in any one of the preceding claims 1–7 wherein four of said keys are non-thumb finger keys and are the only non-thumb finger keys in said keyboard.

11. The keyboard operated signal producing apparatus defined in any one of the preceding claims 1–2 wherein said alphabetic system is the English alphabet.

12. The keyboard operated signal producing apparatus defined in claim 1 including read/write memory means electrically connected to said coded output producing means, and logic circuit means electrically connected to said coded output producing means and to said memory means, said keys being operated by manually depressing them, said logic circuit means supplying a write signal to said memory means in response to the depression of one or more of said keys, and said logic circuit means removing said write signal upon the expiration of a pre-selected time period following the release of the last of the keys which were depressed to produce a given coded output, said memory means being responsive to said write signal to store the coded output produced by said coded output producing means, and said memory means further being responsive to the removal of said write signal to read out the stored output.

13. The keyboard operated signal producing apparatus defined in claim 12 wherein each of the coded outputs is in the form of a plural bit binary word, and wherein the bits of said word are transferred in parallel from said coded output producing means to said memory means.

14. The keyboard operated signal producing apparatus defined in any one of the preceding claims 1, 2 or 12 wherein each of the coded outputs is in the form of a five-bit binary word, and wherein each key in said set determines the binary state of only one pre-selected bit in said word.

15. The keyboard defined in claim 1 wherein said unique coded electrical output is a five bit binary code.

16. The keyboard defined in claim 1 wherein each unique coded electrical output is produced by a single operation of pre-selected ones of said keys.

17. An electrical keyboard device comprising:
(a) a housing;
(b) switch means consisting of five alphabet character-controlling key-switches only, connected in parallel so as to provide individual key-switch signal outputs and positioned to be operated each by a respective one of the five fingers of an operator's hand, for producing a signal responsive to such operation, a said signal being generated when at least one said key-switches is operated, and a key-switch being operated or not operated when contacted or not contacted by the corresponding finger of the operator, said key-switches being operated singly and in combination of two to five key-switches in an operational stroke wherein all of the key-switches corresponding to a single given character are contacted so as to generate a unique output representing a said single given character for each different said stroke;
(c) storage means, located within said housing and connected to the signal outputs of said five key-switches by each operational stroke;
(d) logic means, located within said housing for controlling said storage means such that a said operational stroke of a selection from said five key-switches by respective fingers of the operator's hand causes a corresponding signal to be presented to and stored by said storage means, each of said selections being unique and representing a said single given character, and a corresponding output representing a said character being presented by said storage means after completion of each said stroke; said five key-switches being arranged on a surface of said housing so that each key-switch is located conveniently to a respective one of said five fingers of the operator's hand when the hand is resting on the housing, said five key-switches corresponding to the points of a given five point pattern of which at least one respective point lies on the outline of each letter of the Roman (English) alphabet, a respective said character corresponding to each of the letters of the alphabet and the relationship between the majority of said letters and their respective characters being a pictographic correlation between a major part of the shape of the respective letter and the physical positions of the points of said pattern which correspond to the selection of key-switches required to present the respective character to said storage means, the five character-controlling key-switches comprising upper and lower right-most key-switches, upper and left-most key-switches and a central uppermost key-switch, the letter "l" being represented by the two left-most key-switches and the lower right-most key-switch, and the letter "j" being represented by the two right-most key-switches and the lower left-most key-switch.

18. An electrical keyboard device comprising five alphabet character-controlling key-switches only, arranged in an array on a surface with each key-switch located conveniently to a respective one of the five fingers of an operator's hand such that a selection from said five key-switches can be effected by respective fingers of the operator's hand in an operational stroke, said key-switches generating an output responsive to the contacting of said key-switches with the fingers, a said output being generated when at least one key-switch is operated, and a said switch being operated or not operated when contacted or not contacted by a uni-directional movement of the corresponding finger of the operator, said key-switches being operated singly and in combination of from two to five key-switches, in a said operational stroke wherein all of the key-switches corresponding to a single, given character are contacted so as to generate a unique signal, representing a said single given character, for each different said operational stroke; logic controlled storage means, and logic means connected to said five key-switches and said logic controlled storage means for causing a signal corresponding to an operational stroke and representing a said single given character to be presented to and stored in said storage means when said stroke has been completed, each letter of the Roman (English) alphabet being obtainable as one of the single given characters represented by one of said unique selections, four of the letters of said alphabet being obtainable as a signal at the output of said storage means by the operation of a respective single key and the remaining letters being obtainable as a signal at the output of said storage means each by the operation of at least two keys in positions so correlated with the fingers of the hand and a major part of the shape of the respective letter as to represent distinctive points on the outline of the respective letter, the five character-controlling key-switches comprising upper and lower rightmost key-switches, upper and lower leftmost key-switches and a central uppermost key-switch, the letter "l" being represented by the two left-most key-switches and the lower rightmost key-switch, and the letter "j" being represented by the two rightmost key-switches and the lower leftmost key-switch.

19. An electrical keyboard device comprising:
(a) a signal generator providing an output;
(b) switch means comprising five key-switches connected in parallel with the output of said signal generator to provide five outputs and positioned to be operated each by a respective one of the five fingers of an operator's hand, for producing a signal responsive to such operation, a said signal being generated when at least one said key-switches is operated, and a said key-switch being operated or not operated when contacted or not contacted by a uni-directional movement of the corresponding finger of the operator, said key-switches being operated singly and in combination of from two to five key-switches; in an operational stroke wherein all of the key-switches corresponding to a single given character are contacted so as to generate a unique output, representing a said single given character, for each different said operational stroke, said five key-switches corresponding to the points of a given five point pattern of which at least one respective point lies on the outline of each letter of the Roman (English) alphabet, the letters of said alphabet each corresponding respectively to a respective said character, and the relationship between at least a majority but less than all of said letters and the characters corresponding to the unique outputs generated by said key-switches being a pictographic correlation between a major part of the actual shape and configuration of the respective letter and the physical positions of the points of said pattern which correspond to each selection of key-switches required to produce the respective character, the five character-controlling key-switches comprising upper and lower rightmost key-switches, upper and lower leftmost key-switches and a central uppermost key switch, the letter "l" being represented by the two leftmost key-switches and the lower rightmost key-switch, and the letter "j" being represented by the two rightmost key-switches and the lower leftmost key-switch;
(c) storage means, connected to the outputs of said five key-switches, for receiving and storing each signal produced by said five key-switches by each single stroke operation;
(d) logic means for controlling said storage means such that a said stroke of a selection from said five key-switches by respective fingers of the operator's hand causes a corresponding selection of signals to be presented to and stored by said storage means, each of said selections being unique and representing a said single given character.

20. An electrical keyboard device comprising:
(a) a housing;
(b) switch means consisting of five alphabet character-controlling key-switches only, connected in parallel so as to provide individual key-switch outputs and positioned to be operated each by a respective one of the five fingers of an operator's hand, for producing a signal responsive to such operation, a said signal being generated when at least one said key-switches is operated, and a said key-switch being operated when contacted or not contacted by a uni-directional movement by the corresponding finger of the operator, said key-switches being operated singly and in combination of two to five key-switches, in an operational stroke wherein all of the key-switches corresponding to a single given character are contacted so as to generate a unique output representing a said single given character for each different said stroke;
(c) storage means, located within said housing and connected to the outputs of said five key-switches, for receiving and storing the signal produced by said five key-switches by each operational stroke operation;
(d) logic means, located within said housing, for controlling said storage means such that a said operational stroke of a selection from said five key-switches by respective fingers of the operator's hand causes a corresponding signal to be presented to and stored by said storage means, each of said selections being unique and representing a said single given character, and a corresponding output representing a said character being presented by said storage means after completion of each said stroke, a said output representing a said character being produced when the key-switches corresponding to that character are contacted in any order; said five-switches being arranged on a surface of said housing so that each key-switch is located conveniently to a respective one of said five fingers of the operator's hand when the hand is resting on the housing, said five key-switches corresponding to the points of a given five point pattern of which at least one respective point lies on the outline of each letter of the Roman (English) alphabet, a respective said character corresponding to each of the letters of the alphabet, and the relationship between the majority of said letters and the respective character being a pictographic correlation between a major part of the shape of the respective letter and the physical positions of points of said pattern which correspond to the selection of key-switches required to present the respective character to said storage means, the five character-controlling key-switches comprising upper and lower rightmost key-switches, upper and lower leftmost key-switches and a central uppermost key switch, the letter "l" being represented by the two leftmost key-switches and the lower rightmost key-switch, and the letter "j" being represented by the two rightmost key-switches and the lower leftmost key-switch.

* * * * *

UNITED STATES PATENT AND TRADEMARK OFFICE
CERTIFICATE OF CORRECTION

PATENT NO. : 4,443,789
DATED      : April 17, 1984
INVENTOR(S) : Endfield et al.

It is certified that error appears in the above-identified patent and that said Letters Patent are hereby corrected as shown below:

Change the title to --KEYBOARD-OPERATED SIGNAL PRODUCING SYSTEM--.

Column 2, lines 56 and 57, change "dual complimentary pair plus inverter" to --Dual Complimentary Pair Plus Inverter--.

Column 3, line 25, change "ensue" to --cause--.

Column 5, line 52, change the numeral "one" (second occurrence) to a lower case letter --l--.

Signed and Sealed this

Twelfth Day of August 1986

[SEAL]

Attest:

DONALD J. QUIGG

Attesting Officer

Commissioner of Patents and Trademarks